United States Patent

Guinan et al.

[11] Patent Number: 5,305,609
[45] Date of Patent: Apr. 26, 1994

[54] SEAL ASSEMBLY

[75] Inventors: Daniel P. Guinan, Hobe Sound, Fla.; Donald R. Miehe, Waterloo, Iowa

[73] Assignee: United Technologies Corporation, Hartford, Conn.

[21] Appl. No.: 61,783

[22] Filed: May 14, 1993

[51] Int. Cl.$^5$ ............................................. F02C 1/00
[52] U.S. Cl. ................................. 60/740; 277/102; 277/190
[58] Field of Search .................... 60/270.1, 734, 740; 277/102, 105, 115, 117, 190

[56] References Cited

U.S. PATENT DOCUMENTS

| | | | |
|---|---|---|---|
| 2,804,917 | 9/1957 | Smith et al. | 60/740 |
| 4,170,108 | 10/1979 | Mobsby | 60/39.74 |
| 4,216,651 | 8/1980 | Ormerod | 60/740 |
| 4,466,240 | 8/1984 | Miller | 60/740 |

FOREIGN PATENT DOCUMENTS 2097112  10/1982  United Kingdom ................ 60/740

Primary Examiner—Richard A. Bertsch
Assistant Examiner—William Wicker
Attorney, Agent, or Firm—Edward L. Kochey, Jr.

[57] ABSTRACT

A fuel injector 14 passes through wall 10 to inject fuel into a hot supersonic air flow 12. Wedge seals 26, 28 seal against leakage in cooperation with injection air flow 37, being compressed within seal carrier 16. Face seals 30, 32 are compressed by cover plate 34. Inboard seals 26, 44 are preferably more porous than the outboard seals so that there is a leakage of cooling air through crevice 44.

6 Claims, 2 Drawing Sheets

SEAL ASSEMBLY

The Government has rights in this invention pursuant to a contract awarded by the Department of the Air Force.

TECHNICAL FIELD

The invention relates to gas seals and in particular to a high temperature seal around a fuel injector for injecting fuel into a high temperature supersonic gas flow.

BACKGROUND OF THE INVENTION

On occasion there is a need to inject fuel into high temperature supersonic air flow. There is a need to retract the fuel injectors when they are not in use to avoid overheating and therefore one must be able to insert and retract the fuel nozzles.

The fuel is introduced simultaneously at a plurality of closely spaced locations. Therefore a plurality of injectors are joined in a header system in the form of a rake. Because of the differential thermal expansion between the wall containing the supersonic air flow and the header system, each injector must be able to move parallel to the surface of the wall through which it passes as well as in and out of the wall. It must at the same time seal against egress or leakage of hot gas from the gas flow path.

SUMMARY OF THE INVENTION

The fuel injector arrangement includes an elongated fuel injector having a cross sectional shape of a supersonic aerodynamic wedge. This fuel injector extends through and is substantially perpendicular to the wall confining the high temperature supersonic gas flow. A seal carrier is comprised of an inner plate, a central plate and a outer plate. These plates have inner faces and outer faces and edges and are are parallel to each other and to the wall. They surround the fuel injector.

The plates are compressively joined thereby compressing an inner wedge seal located between the edges of the inner and central plates. Also compressed is an outer wedge seal located between the edges of the outer and central plates. This wedge seal is located adjacent the injector and is urged thereagainst under compression.

The seal carrier is countersunk in the wall from its outer side. An innerface seal is located on the inner face of the seal carrier and an outer face seal on the outer seal carrier. A cover plate compresses these face seals and is itself sealed to the wall. A coolant flow path through the wall passes into a plenum surrounding the seal carrier outside of the face seals. The inner seals are more porous then the outer seals, whereby the coolant flow from the plenum will tend to pass into the supersonic gas flow to deter leakage therefrom in preference to outward leakage.

DESCRIPTION OF THE PREFERRED EMBODIMENT

Figure 1:
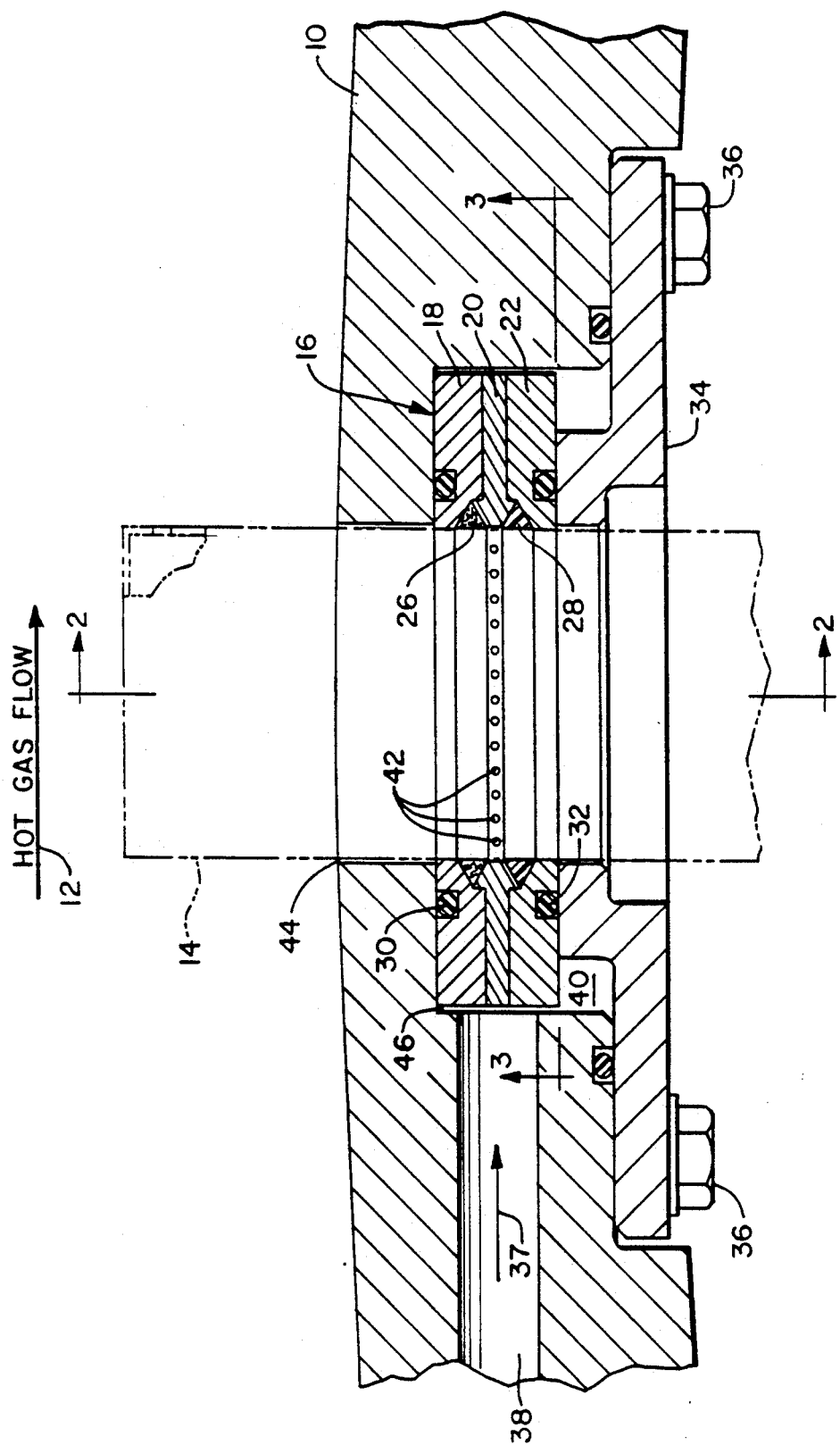
FIG. 1 is a sectional view of a fuel injector and seal.
Figure 2:
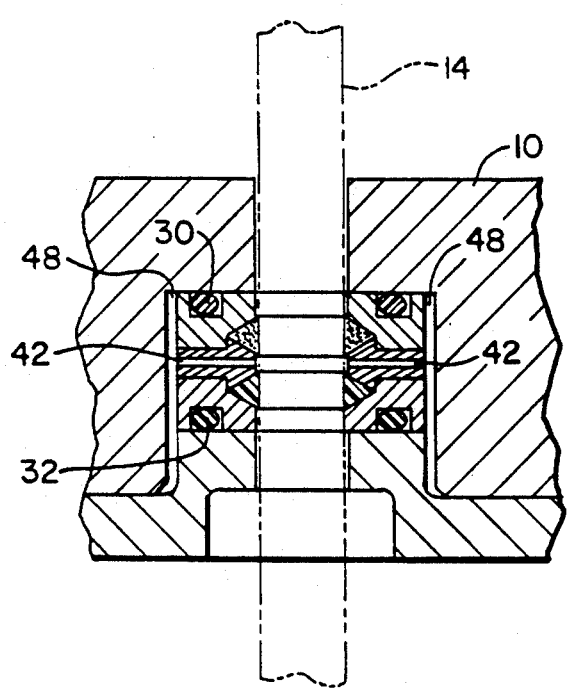
FIG. 2 is a section 2—2 through FIG. 1.
Figure 3:
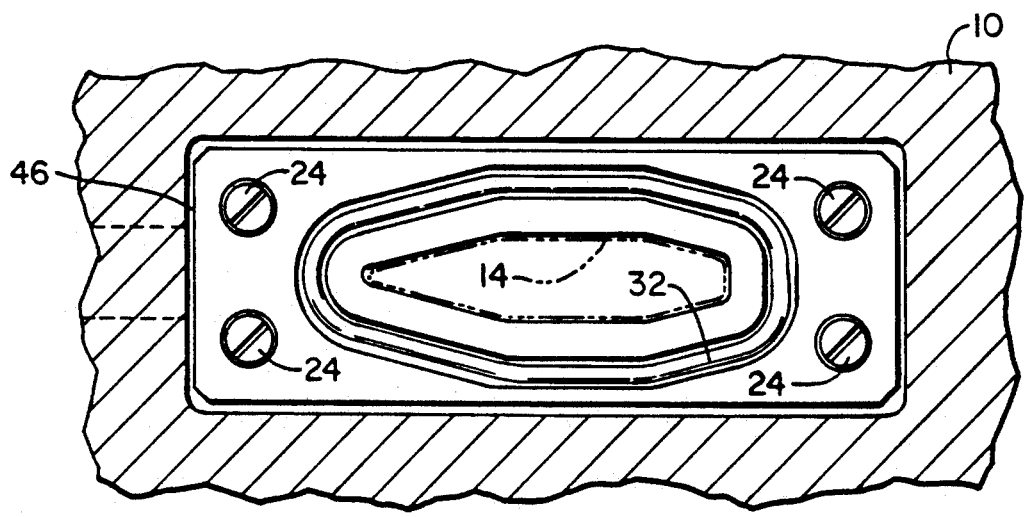
FIG. 3 is a section 3—3 through FIG. 1.

Referring to FIG. 1 wall 10 contains a high temperature supersonic gas flow 12. Fuel injector 14 as arranged substantially perpendicular to wall 10 and will slide in and out of the gas flow as required. The fuel injector has cross sectional shape of a modified supersonic aerodynamic wedge as best seen in FIG. 3.

A seal carrier 16 is formed of an inner plate 18, a central plate 20 and an outer plate 22. These three plates are compressively joined by countersunk screws 24.

An inner wedge seal 26 is located between the edge of inner plate 18 and the edge of central plate 20 adjacent the fuel injector 14. An outer wedge seal 28 is located between the edge of the outer plate 22 and the edge of the central plate 20 adjacent fuel injector 14. Compressive joining of the plates by screws 24 compresses and activates these wedge seals to exert sealing force against the fuel injector 14.

The seal carrier is countersunk in wall 10. An inner face seal 30 is located on the inner face of the inner plate 18 surrounding but spaced from the injector 14. An outer face seal 32 is located on the outer face of the outer plate, also surrounding but spaced from the injector 14. A cover plate 34 secured by bolts 36 to the wall compresses the seal carrier and the seals 30 and 32. A flow of low temperature but high pressure coolant gas 37 passes through coolant flow path 38 located in wall 10. This delivers coolant to a plenum 40 which surrounds the seal carrier outwardly of the face seals 30 and 32. Openings 42 through the central plate 20 convey the coolant gas to a location adjacent the fuel injector 14 between wedge seals 26 and 28.

Wedge seal 26 is more porous than wedge seal 28. Preferably the seal 26 is of woven ceramic while seal 28 is teflon. Accordingly, the injection flow through openings 42 tends to pass preferentially into the hot gas flow 12, thereby deterring leakage through crevice 44. With sufficient injection of the coolant flow between the seals, any leakage past the outer wedge seal 28 will be the injected coolant rather than the hot gas flow 12.

In a similar manner, innerface seal 30 is of a woven ceramic fiber and is more porous than outer face seal 32 which is a teflon seal. In a similar manner the leakage will preferentially pass through the seal 30 for injection and cooling the area of the fuel injector.

Clearances 46 and 48 permit motion of the seal assembly in a direction parallel to the wall while the fuel injector may move perpendicular to the wall by sliding on seals 26 and 28. This permits the desired three directional motion of the seal assembly.

The double seal arrangements provide for injection sealing and preferential leakage for cooling. Seals 26 and 28 are arranged to accept the reaction loads without impingement of the fuel injector on the metal surrounding parts. The radially loading of seals 26 and 28 is accomplished by the angled groove and the screw force of joining screws 24.

We claim:

1. A fuel injector arrangement for injecting fuel into a high temperature supersonic gas flow bounded by a wall, having an inner and outer side comprising:
   an elongated fuel injector extending through and substantially perpendicular to said wall;
   a seal carrier comprised of an inner plate, a central plate and an outer plate, said plates having inner faces and outer faces and edges and being parallel to each other and to said wall, and surrounding said injector;
   joining means for compressively joining said plates;
   an inner wedge seal between the edge of said inner and central plates adjacent said injector and in contact with said injector;

an outer wedge seal between the edges of said outer and central plates adjacent said injector and in contact with said injector;

said seal carrier countersunk in said wall from the outerside thereof;

an inner face seal located on the inner face of said inner plate surrounding but spaced from said injector;

an outer face seal located on said outer face of said outer plate surrounding but spaced from said injector;

a cover plate sealingly secured to said wall and compressing said seal carrier inner and outer face seals; and a coolant flow path through said wall and into a plenum surrounding said seal carrier outside said face seals.

2. A fuel injector arrangement as in claim 1 further comprising:

openings through said central plate from said plenum to a location adjacent said injector.

3. A fuel injector arrangement as in claim 2 further comprising:

said inner face seal being more porous than said outer face seal.

4. A fuel injector arrangement as in claim 2 further comprising:

said inner wedge seal being more porous than said outer wedge seal.

5. A fuel injector arrangement as in claim 4 further comprising:

said inner face seal being more porous than said outer face seal.

6. A fuel injector arrangement as in claim 5 wherein:

said inner face seal and said inner wedge seal are formed of woven ceramic; and said outer face seal and said outer wedge seal are formed of teflon.

* * * * *